(12) United States Patent
Chen et al.

(10) Patent No.: US 12,367,196 B2
(45) Date of Patent: Jul. 22, 2025

(54) MANAGING DATA FOR UNIFIED ENTITY SEARCH

(71) Applicant: SAP SE, Walldorf (DE)

(72) Inventors: Jennifer Chen, Los Gatos, CA (US);
Phiroze Dastoor, Redwood City, CA (US); Rashmi Shiva Prakash, Mountain House, CA (US); Basava Rajesh Yummadisingh, Bengaluru (IN); Amit Chokshi, Houston, TX (US); Mohammad Yaqub, Danville, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/503,038

(22) Filed: Nov. 6, 2023

(65) Prior Publication Data

US 2025/0147966 A1 May 8, 2025

(51) Int. Cl.
*G06F 17/00* (2019.01)
*G06F 16/2455* (2019.01)

(52) U.S. Cl.
CPC .............................. *G06F 16/24556* (2019.01)

(58) Field of Classification Search
CPC ................................................ G06F 16/24556
See application file for complete search history.

(56) References Cited

U.S. PATENT DOCUMENTS

| | | | | |
|---|---|---|---|---|
| 9,256,655 | B2 * | 2/2016 | Moser | H04L 67/565 |
| 10,955,992 | B2 * | 3/2021 | Hooton | H04L 67/01 |
| 2014/0181020 | A1 * | 6/2014 | Kreindlina | G06F 16/258 |
| | | | | 707/624 |
| 2014/0324882 | A1 * | 10/2014 | Giovanni | G06F 16/2246 |
| | | | | 707/742 |
| 2019/0163802 | A1 * | 5/2019 | MacLean | G06F 16/27 |
| 2022/0245146 | A1 * | 8/2022 | Mimms | G06F 16/24532 |
| 2023/0350871 | A1 * | 11/2023 | Kara | G06F 16/2365 |
| 2023/0367761 | A1 * | 11/2023 | Kamath | G06F 16/2365 |

OTHER PUBLICATIONS

Sebastian Jeuk, Jakub Szefer, and Shi Zhou. 2014. Towards cloud, service and tenant classification for cloud computing. In Proceedings of the 14th IEEE/ACM International Symposium on Cluster, Cloud, and Grid Computing (CCGRID '14). IEEE Press, 792-801. <https://doi.org/10.1109/CCGrid.2014.71>, May (Year: 2014).*

* cited by examiner

*Primary Examiner* — Greta L Robinson
(74) *Attorney, Agent, or Firm* — Fountainhead Law Group, PC

(57) ABSTRACT

Some embodiments provide a non-transitory machine-readable medium that stores a program. The program receives a set of master data for an entity from a master data system. The set of master data for the entity comprises a master data entity ID for uniquely identifying the entity. The program further receives a set of data associated with the entity from a set of applications configured to generate data associated with the entity and reference the entity using the master data entity ID when generating the of set data associated with the entity. The program also sends the set of master and the set of data associated with the entity to a search system for the search system to aggregate the set of master data for the entity and the set of data associated with the entity into a single record of data for the entity.

17 Claims, 9 Drawing Sheets

MANAGING DATA FOR UNIFIED ENTITY SEARCH

BACKGROUND

Software applications are computer programs that are designed to perform specific tasks or functions for end-users or other software programs/systems. Software applications may be installed and run on a variety of computing devices (e.g., personal computers, smartphones, tablets, servers, etc.). Data entities can be a software construct used to model an object (e.g., a real-world object), a concept, or a thing. Data entities may have a set of attributes for describing the entity. In some instances, software applications operating on the same or different systems may generate data associated with entities. In many cases, the data that the software applications generate are associated with the same entities. In such cases, the information about an entity is scattered across the many software applications. When trying to perform a search for particular entities (e.g., entities that have certain attribute values), a user might have to perform separate searches on each application and piece the information together to get the information that the user desires.

SUMMARY

In some embodiments, a non-transitory machine-readable medium stores a program executable by at least one processing unit of a device. The program receives a set of master data for an entity from a master data system. The set of master data for the entity comprises a master data entity ID for uniquely identifying the entity. The program further receives a set of data associated with the entity from a set of applications configured to generate data associated with the entity and reference the entity using the master data entity ID when generating the of set data associated with the entity. The program also sends the set of master and the set of data associated with the entity to a search system for the search system to aggregate the set of master data for the entity and the set of data associated with the entity into a single record of data for the entity.

In some embodiments, the set of master data for the entity and the set of data associated with the entity belong to a tenant. The master data system uses a tenant ID to uniquely identify the tenant within the master data system. The program further determines a global tenant ID for the tenant based on the tenant ID. Sending the set of master data to the search system comprises including the global tenant ID for the tenant with the set of master data. Determining the global tenant ID for the tenant comprises determining the global tenant ID for the tenant further based on a defined mapping that maps the global tenant ID to the tenant ID used by the master data system. The tenant ID is a first tenant ID and the global tenant ID is a first global tenant ID. An application in the set of applications operating on a system is configured to use a second tenant ID to uniquely identify the tenant within the system. The program further determines a second global tenant ID for the tenant based on the second tenant ID. Sending the set of data associated with the entity to the search system comprises including the second global tenant ID for the tenant with the set of data associated with the entity. A first value of the first global tenant ID is the same as a second value of the second global tenant ID.

In some embodiments, the program further receives, from a particular application, a query for a set of data associated with a set of entities, in response to receiving the query; forwards the query to the search system for the search system to process the query based on a set of single records of data for entities managed by the search system; receives a set of results for the query from the search system; and sends the set of results for the query to the particular application.

In some embodiments, the search system aggregates the set of master data and the set of data associated with the entity into the single record of data for the entity by, upon receiving the set of master data for the entity, generating the single record of data for the entity and including the set of master data for the entity in the single record of data, and, upon receiving the set of data associated with the entity, using the set of data associated with the entity to update the single record of data.

In some embodiments, sending the set of master data and the set of data associated with the entity to the search system comprises sending the set of master data to the search system before sending the set of data associated with the entity to the search system.

In some embodiments, a method receives a set of master data for an entity from a master data system. The set of master data for the entity comprises a master data entity ID for uniquely identifying the entity. The method further receives a set of data associated with the entity from a set of applications configured to generate data associated with the entity and reference the entity using the master data entity ID when generating the of set data associated with the entity. The method also sends the set of master and the set of data associated with the entity to a search system for the search system to aggregate the set of master data for the entity and the set of data associated with the entity into a single record of data for the entity.

In some embodiments, the set of master data for the entity and the set of data associated with the entity belong to a tenant. The master data system uses a tenant ID to uniquely identify the tenant within the master data system. The method further determines a global tenant ID for the tenant based on the tenant ID. Sending the set of master data to the search system comprises including the global tenant ID for the tenant with the set of master data. Determining the global tenant ID for the tenant comprises determining the global tenant ID for the tenant further based on a defined mapping that maps the global tenant ID to the tenant ID used by the master data system. The tenant ID is a first tenant ID and the global tenant ID is a first global tenant ID. An application in the set of applications operating on a system is configured to use a second tenant ID to uniquely identify the tenant within the system. The method further determines a second global tenant ID for the tenant based on the second tenant ID. Sending the set of data associated with the entity to the search system comprises including the second global tenant ID for the tenant with the set of data associated with the entity, wherein a first value of the first global tenant ID is the same as a second value of the second global tenant ID.

In some embodiments, the method further receives, from a particular application, a query for a set of data associated with a set of entities; in response to receiving the query, forwards the query to the search system for the search system to process the query based on a set of single records of data for entities managed by the search system; receives a set of results for the query from the search system; and sends the set of results for the query to the particular application.

In some embodiments, the search system aggregates the set of master data and the set of data associated with the entity into the single record of data for the entity by, upon receiving the set of master data for the entity, generating the single record of data for the entity and including the set of master data for the entity in the single record of data, and, upon receiving the set of data associated with the entity, using the set of data associated with the entity to update the single record of data.

In some embodiments, sending the set of master data and the set of data associated with the entity to the search system comprises sending the set of master data to the search system before sending the set of data associated with the entity to the search system.

In some embodiments, a system comprises a set of processing units and a non-transitory machine-readable medium that stores instructions. The instructions cause at least one processing unit to receive a set of master data for an entity from a master data system. The set of master data for the entity comprises a master data entity ID for uniquely identifying the entity. The instructions further cause the at least one processing unit to receive a set of data associated with the entity from a set of applications configured to generate data associated with the entity and reference the entity using the master data entity ID when generating the of set data associated with the entity. The instructions also cause the at least one processing unit to send the set of master and the set of data associated with the entity to a search system for the search system to aggregate the set of master data for the entity and the set of data associated with the entity into a single record of data for the entity.

In some embodiments, the set of master data for the entity and the set of data associated with the entity belong to a tenant. The master data system uses a tenant ID to uniquely identify the tenant within the master data system. The instructions further cause the at least one processing unit to determine a global tenant ID for the tenant based on the tenant ID, wherein sending the set of master data to the search system comprises including the global tenant ID for the tenant with the set of master data. Determining the global tenant ID for the tenant comprises determining the global tenant ID for the tenant further based on a defined mapping that maps the global tenant ID to the tenant ID used by the master data system. The tenant ID is a first tenant ID and the global tenant ID is a first global tenant ID. An application in the set of applications operating on a system is configured to use a second tenant ID to uniquely identify the tenant within the system. The instructions further cause the at least one processing unit to determine a second global tenant ID for the tenant based on the second tenant ID. Sending the set of data associated with the entity to the search system comprises including the second global tenant ID for the tenant with the set of data associated with the entity, wherein a first value of the first global tenant ID is the same as a second value of the second global tenant ID.

In some embodiments, the instructions further cause the at least one processing unit to receive, from a particular application, a query for a set of data associated with a set of entities; in response to receiving the query, forward the query to the search system for the search system to process the query based on a set of single records of data for entities managed by the search system; receive a set of results for the query from the search system; and send the set of results for the query to the particular application.

In some embodiments, the search system aggregates the set of master data and the set of data associated with the entity into the single record of data for the entity by, upon receiving the set of master data for the entity, generating the single record of data for the entity and including the set of master data for the entity in the single record of data, and, upon receiving the set of data associated with the entity, using the set of data associated with the entity to update the single record of data.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for managing data for unified entity search. In some embodiments, a system includes a master data system, a data processing system, a search system, and several systems of applications and services. The master data system manages master data that describes entities. The several systems of applications and services include applications and services that generate data associated with entities. The master data system and systems of applications and services are each configured to use a unified data model where the same identifiers are used to reference the same entities. The data processing system is responsible for managing the data used to create single records of data for entities. For example, the data processing system can receive master data from master data system and receive data associated with entities from the systems of applications and services. The data processing system sends the search system the master data from master data system and the data associated with entities. Since the data that the search system receives is organized according to the unified data model, the search system can aggregate data belonging to the same entity together and create a single record of data for the entity. With these single records of data for entities, the search system can now provide a single place where users can perform searches on entities even though the data about the entities are spread across multiple systems, applications, and/or services.

The techniques described in the present application provide a number of benefits and advantages over conventional methods for searching for entity data. Providing a single place where users can perform searches on entities allows searches for information about entities to be performed faster. Conventional methods may search for entity data at each and every system, application, and/or service that generates data about entities. In addition, providing a single place where users can perform searches on entities can reduce the amount of bandwidth utilized since users only need to communicate with one system to perform the searches as opposed to the conventional methods, which require users to communicate with multiple systems, applications, and/or services.

Figure 1:
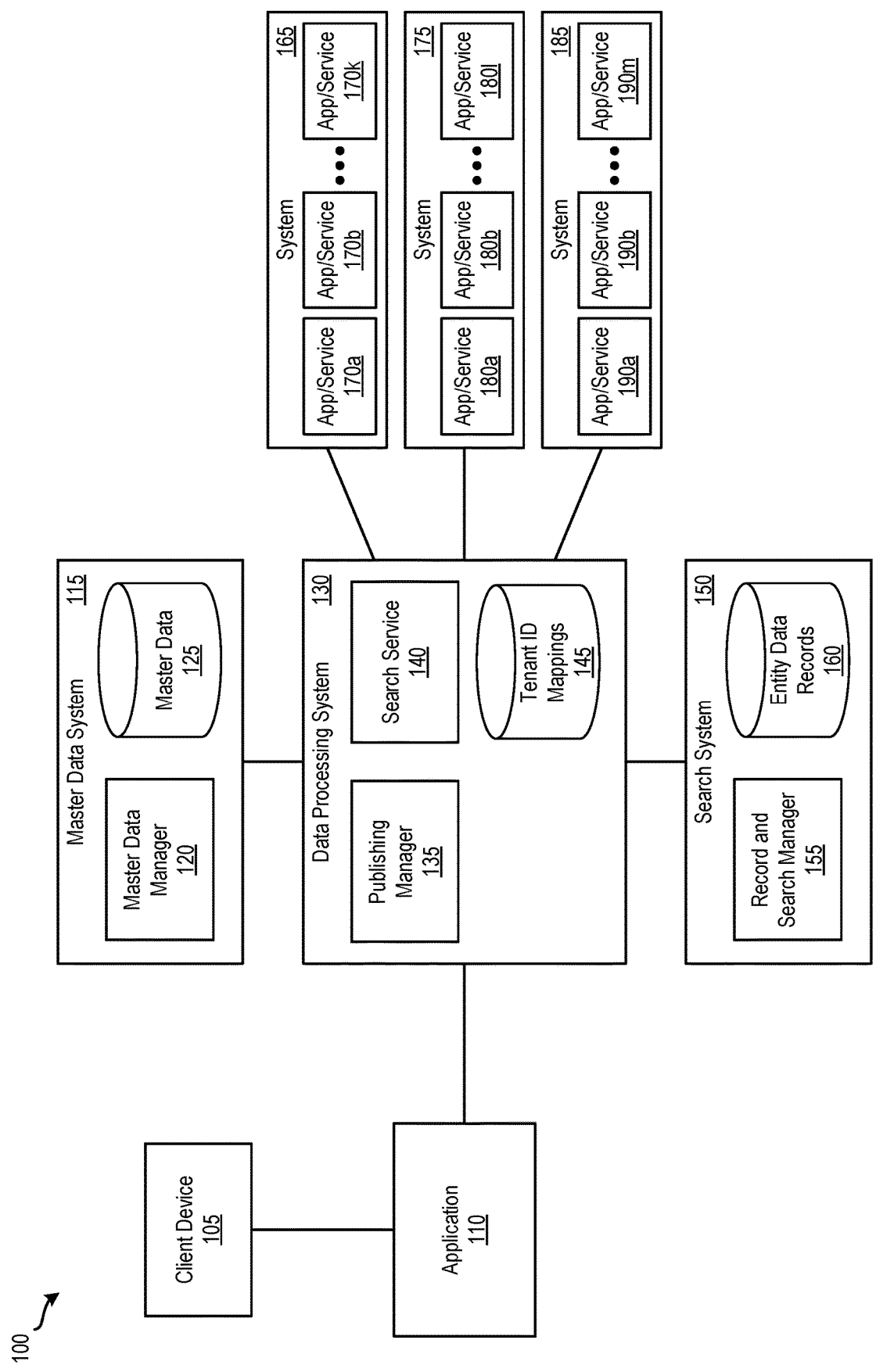
FIG. 1 illustrates a system for managing data for unified entity search according to some embodiments.

FIG. 1 illustrates a system 100 for managing data for unified entity search according to some embodiments. As shown, system 100 includes client device 105, application 110, master data system 115, data processing system 130, search system 150, and systems of applications and services 165-185. Client device 105 interacts and communicates with application 110. For example, a user of client device 105 may send application 110 a query for entities (e.g., entities having certain values for a specific set of attributes, entities not having certain values for a specific set of attributes, or a combination thereof). In return, client device 105 can receive a set of results for the query from application 110, which client device 105 can provide to the user.

Application 110 is a software application configured to provide client device 105 a search function for performing searches for entities. For instance, application 110 can receive a query for entities from client device 105. In response, application 110 forwards the query to data processing system 130. When application 110 receives a set of results for the query from data processing system 130, application 110 forwards it to client device 105. In some embodiments, application 110 operates on a separate computing system (not shown). In other embodiments, application 110 may operate on another system in system 100 (e.g., data processing system 130, one of the systems of applications and services 165, 175, 185, etc.). While FIG. 1 shows one application that client device 105 can use to perform searches for entities, one of ordinary skill in the art will appreciate that system 100 may include any number of applications that each provides a search function to client device 105 for performing searches for entities.

Master data system 115 is responsible for managing master data that describes entities. As depicted in FIG. 1, master data system 115 includes master data manager 120 and master data storage 125. Master data storage 125 stores master data describing entities. In some embodiments, master data is a set of core or foundational data elements used within an organization to describe entities that are central to the organization (e.g., as customers, products, employees, suppliers, locations, etc.). In some embodiments, master data can be shared across multiple systems (e.g., enterprise resource planning (ERP) systems, customer relationship management (CRM) software systems, supply chain management systems, etc.), departments, and/or processes. Master data may be considered essential for the day-to-day operations of the organization and serves as a consistent and authoritative source of information. In some embodiments, master data M is relatively stable and does not change frequently compared to transactional data. As such, in some such embodiments, master data can be referred to as non-transactional data. For example, transactional data may capture day-to-day activities (e.g., sales orders, purchase orders, etc.) whereas master data may capture the static information about the entities involved in those activities (e.g., customer information, product descriptions, supplier information, etc.). Master data manager 120 is configured to manage master data. For example, at defined intervals (e.g., once a minute, once every five minutes, once every half an hour, once an hour, etc.), master data manager 120 can send master data describing entities to data processing system 130. The master data that master data manager 120 sends data processing system 130 at each interval may include any new master data that has been added to master data storage 125 since the last interval and any updates to existing master data in master data storage 125 made since the last interval.

Systems of applications and services 165-185 host applications and/or services that generate data associated with entities. As depicted in FIG. 1, system of application and services 165 includes applications/services 170a-k, system of application and services 175 includes applications/services 180a-1, and system of applications and services 185 includes applications/services 190a-m. Each of the applications/services in systems 165-185 may be configured to generate data associated with entities that are described by master data managed by master data system 115. Examples of such generated data include key indicator (KI) data, evaluation data, survey data, qualification data, risk data, etc. When an application/service 170/180/190 generates data associated with an entity, the application/service may send it to data processing system. In some embodiments, the applications/services 170/180/190 sends the generated data to data processing system 130 via a data streaming platform (not shown) that facilitates the streaming of data in real-time or near real-time.

Data processing system 130 is configured to manage data that is used to create single records of data for entities and facilitate the search for entities based on the single records of data. As illustrated in FIG. 1, data processing system includes publishing manager 135, search service 140, and tenant ID mappings storage 145. Tenant ID mapping storage 145 stores mappings between local tenant IDs and global tenant IDs. In some embodiments, some of the components (e.g., application 110, master data system 115, systems of applications/services 165-185, etc.) in system 100 may be utilized by one or more tenants. A tenant may refer to an entity or user who share access to a system and the applications and/or services operating on the system. A particular system can assign a tenant of the particular system with a tenant ID that uniquely identifies the tenant within the particular system thereby allowing the particular system to keep data belonging to different tenants separate. This may be referred to as a local tenant ID. Each system assigns its own tenant IDs so a particular tenant that has access to several components in system 100 can have different tenant ID values assigned to the particular tenant for the different components. For example, a tenant that has access to system 165 and system 185 may be assigned a first tenant ID by system 165 and assigned a second tenant ID by system 185. The value of the first tenant ID is highly likely to be different than the value of the second tenant ID since system 165 and system 185 assigns their tenant IDs to the tenant independently of each other. For this reason, tenant ID mappings are used to associate local tenant IDs belonging to the same tenant to a global tenant ID that uniquely identifies the tenant. In some embodiments, when a system sends data to data processing system 130, the system includes the tenant ID of the tenant to which the data belongs. For instance, when master data system 115 sends data processing system 130 master data that belongs to a particular tenant, master data system 115 includes the tenant ID of the particular tenant in the master data. Similarly, when system 175 sends data generated by an application/service 170 that belongs to a particular tenant, system 175 includes the tenant ID of the particular tenant in the generated data.

Publishing manager 135 is responsible for managing data that is used to create single records of data for entities. For example, publishing manager 135 can receive master data describing entities from master data system 115. In response to receiving the master data, publishing manager 135 determines a global tenant ID of a tenant to which the master data belongs based on local tenant ID included in the master data and the tenant ID mappings stored in tenant ID mappings storage 145 (e.g., by identifying a tenant ID mapping that specifies a local tenant ID that matches the local tenant ID included in the master data and determining the global tenant ID specified in the identified mapping as the global tenant ID of the tenant). Then, publishing manager 135 sends the master data and the determined global tenant ID to search system 150. Similarly, when publishing manager 135 receives data from one of the systems 165-185, publishing manager 135 determines a global tenant ID of a tenant to which the data belongs based on local tenant ID included in the data and the tenant ID mappings stored in tenant ID mappings storage 145 (e.g., by identifying a tenant ID mapping that specifies a local tenant ID that matches the local tenant ID included in the data and determining the global tenant ID specified in the identified mapping as the global tenant ID of the tenant). Publishing manager 135 then sends the data and the determined global tenant ID to search system 150.

Search service 140 is responsible for facilitating the search for entities. For instance, search service 140 may receive a query for entities and a local tenant ID from application 110. In response, search service 140 determines a global tenant ID of a tenant to which the query belongs based on local tenant ID included in the query and the tenant ID mappings stored in tenant ID mappings storage 145 (e.g., by identifying a tenant ID mapping that specifies a local tenant ID that matches the local tenant ID included in the query and determining the global tenant ID specified in the identified mapping as the global tenant ID of the tenant). Next, search services 140 sends the query and the determined global tenant ID to search system 150 for processing. Upon receiving a set of results for the query from search system 150, search service 140 forwards the set of result for the query to application 110.

Search system 150 handles the creation of single records of data for entities and the processing of queries. In some embodiments, search system 150 is implemented as a document-based search platform. As shown in FIG. 1, search system 150 includes record and search manager 155 and entity data records storage 160. Entity data records storage 160 stores single records of data for entities. A single record of data for an entity can include master data describing the entity and data associated with the entity that is generated by a set of applications/services 170/180/190. In some embodiments, each single record of data for an entity is implemented as a file. The records of data in entity data records storage 160 may be indexed. The indexed data can be used to process queries.

Figure 2:
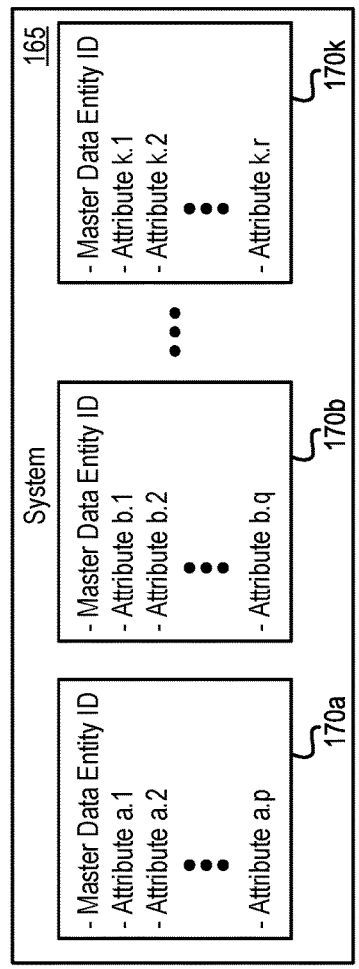
FIG. 2 illustrates an example data model according to some embodiments.
Figure 2:
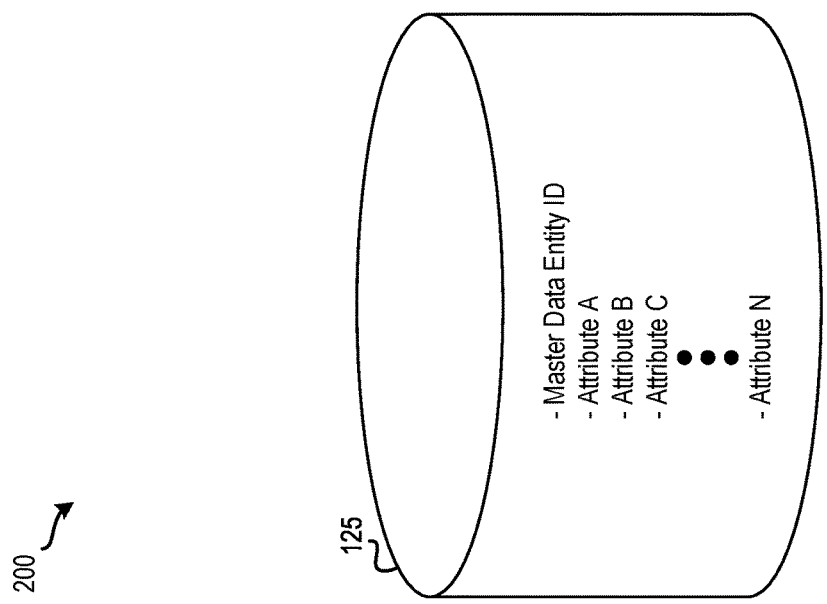

As mentioned above, master data system 115 and systems of applications and services 165-185 are each configured to use a unified data model where the same identifiers are used to reference the same entities. FIG. 2 illustrates an example data model 200 according to some embodiments. Specifically, data model 200 is an example of a unified data model that master data system 115 and systems of applications and services 165-185 are each configured to use in some embodiments. As shown, data model 200 specifies a set of attributes that are used in master data storage 125. For this example, master data storage 125 is configured to store master data that includes a master data entity ID for uniquely identifying a master data entity and a set of attributes A-N. In this example, data model 200 also specifies a set of attributes associated with an entity that each application/service 170a-k in system 165 can generate. In particular, application/service 170a can generate attributes a.1-a.p, application/service 170b can generate attributes b.1-b.q, and application/service 170k can generate attributes k.1-k.r. Each set of attributes may be associated with a master data entity by referencing the master data entity via a master data entity ID. Using the same identifiers (i.e., a master entity ID) to reference the same entities in data model 200 allows data spread across different systems, applications, and/or services to be identified as being associated with the same entity. Although not shown in FIG. 2, the data generated by applications/services 180a-l and 190a-m are also part of data model 200 and modeled in the same or similar way as that shown in FIG. 2. Thus, applications/services 180a-1 and 190a-m also use a master entity ID to associate attributes they generate with a master data entity.

Figure 3A:
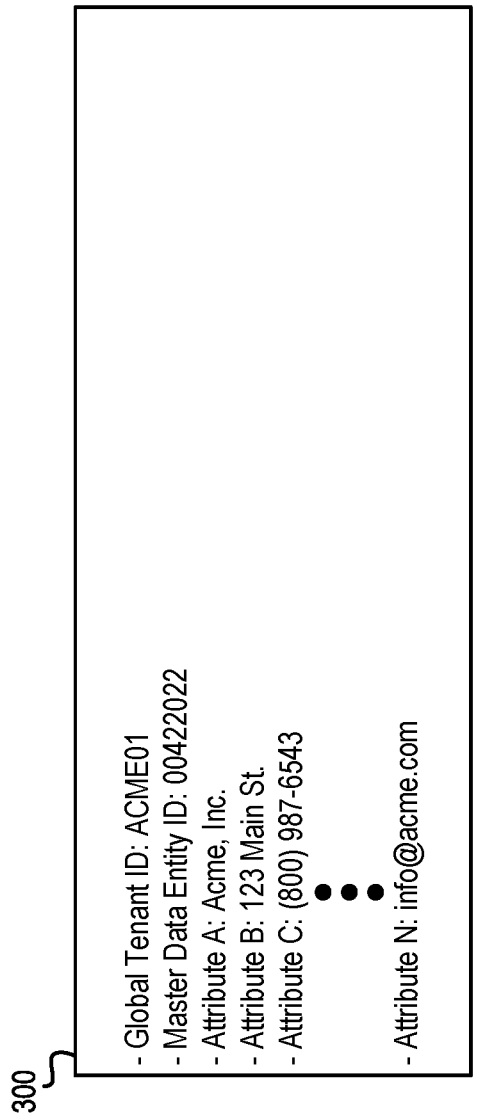
FIGS. 3A-3C illustrate an example record of data for an entity according to some embodiments.
Figure 3B:
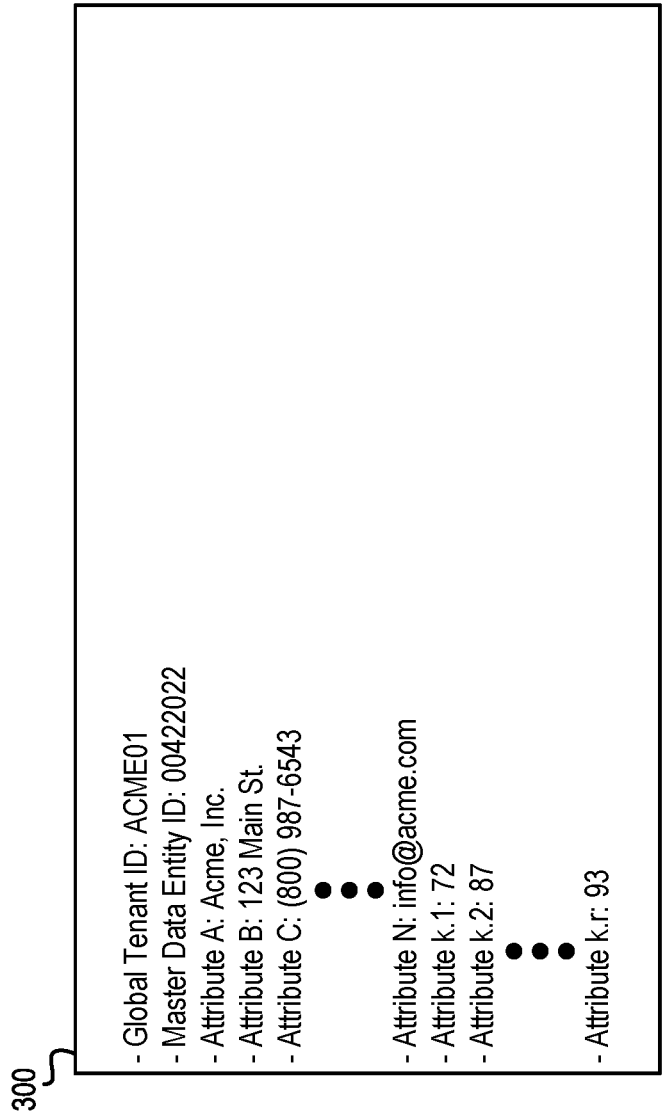
Figure 3C:
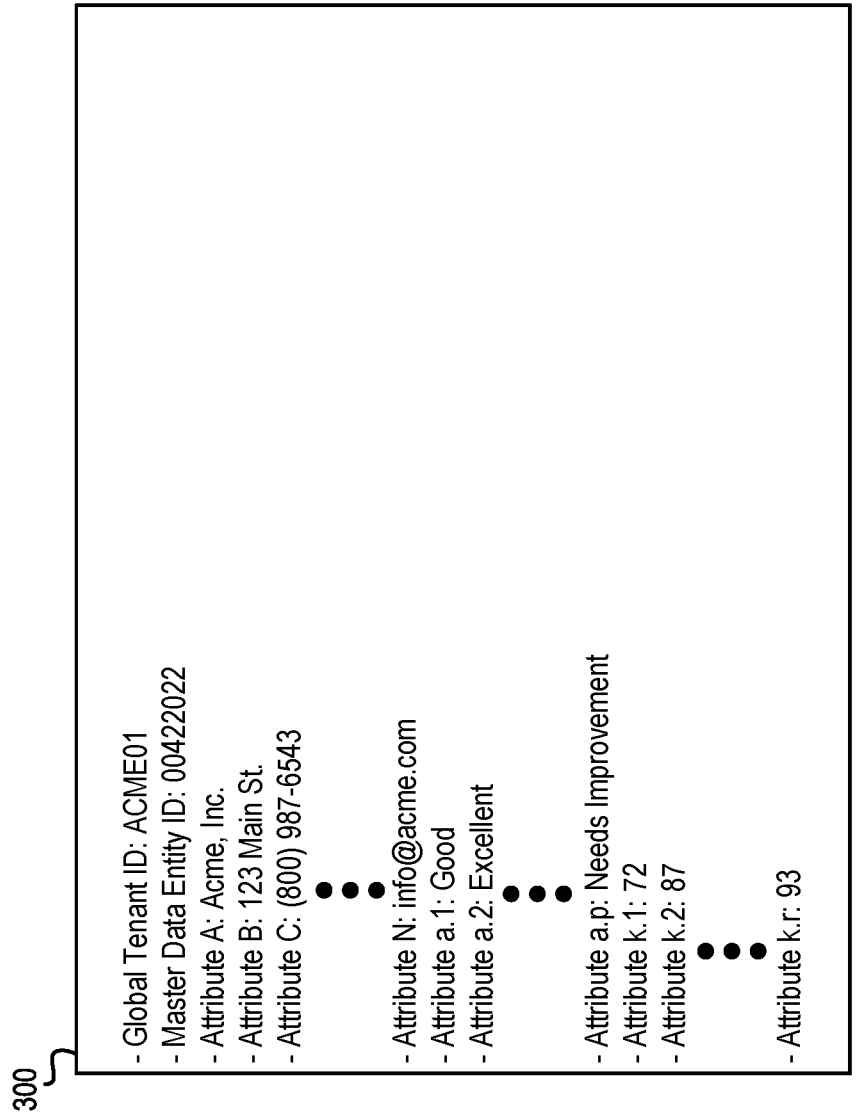

As mentioned above, master data manager 120 may send master data describing entities to data processing system 130 at defined intervals. When master data manager 120 sends master data to data processing system 130, master data manager 120 includes the master data entity IDs of the entities with which the master data is associated. Similarly, when an application/service 170/180/190 generates data associated with an entity that is described by master data managed by master data system 115, the application/service includes the master data entity ID of the corresponding entity. The master data entity ID Returning to FIG. 1, record and search manager 155 is configured to create single records of data for entities. For example, record and search manager 155 may receive master data, a master data entity ID, and a global tenant ID from data processing system 130. In response, record and search manager 155 determines whether a record exists in entity data records storage 160 with values for the master data entity ID and the global tenant ID attributes that matches the values of the master data entity ID and the global tenant ID received from data processing system 130. If such a records exists, record and search manager 155 updates the existing record in entity data records storage 160 with the master data. If not, record and search manager 155 generates a single record of data for the entity that belongs to the tenant. FIGS. 3A-3C illustrate an example record of data for an entity according to some embodiments. The data in the example shown in FIGS. 3A-3C is modeled using data model 200. FIG. 3A illustrates a single record of data 300 for an entity. As shown, single record of data 300 includes a global tenant ID that uniquely identifies the tenant to which the record belongs, a master data entity ID that uniquely identifies a master data entity with which the data in the record is associated, and a set of values for the set of attributes A-N specified in data model 200 for describing the master data entity. Here, attribute A represents the name of the master data entity, attribute B represents the address of the master data entity, attribute C represents a telephone number of the master data entity, and attribute N represents an email address of the master data entity.

As another example, record and search manager 155 can receive data generated by an application/service 170/180/190, a master data entity ID, and a global tenant ID from data processing system 130. Upon receiving this data, record and search manager 155 accesses entity data records storage 160 to identify a record of data with values for the master data entity ID and the global tenant ID attributes that matches the values of the master data entity ID and the global tenant ID received from data processing system 130. Then, record and search manager 155 updates the identified record with the data generated by the application/service 170/180/190. FIG. 3B illustrates the single record of data 300 after it is updated with data generated by an application/service 170/180/190. For this example, the data that records and search manager 155 receives from data processing system 130 is generated by application/service 170$k$ in system 165. As depicted in FIG. 3B, single record of data 300 further includes attributes k.1-k.r, which represent various different KI scores associated with the master data entity. FIG. 3C illustrates the single record of data 300 after it is updated with data generated by another application/service 170/180/190. In this example, the data that records and search manager 155 receives from data processing system 130 is generated by application/service 170$a$ in system 165. As illustrated, single record of data 300 further includes attributes a.1-a.p, which represent different survey ratings associated with the master data entity.

Record and search manager 155 is also responsible for processing queries. For instance, record and search manager 155 may receive a query for entities and a global tenant ID from data processing system 130. In response, record and search manager 155 processes the query by accessing entity data records 160 and identifying records of data that match the query. The identified records form a set of results for the query. Then, records and search manager 155 sends the set of results for the query to data processing system 130. In some embodiments, search system 150 includes a semantic search engine (not shown) that record and search manager 155 uses to process the query.

Figure 4:
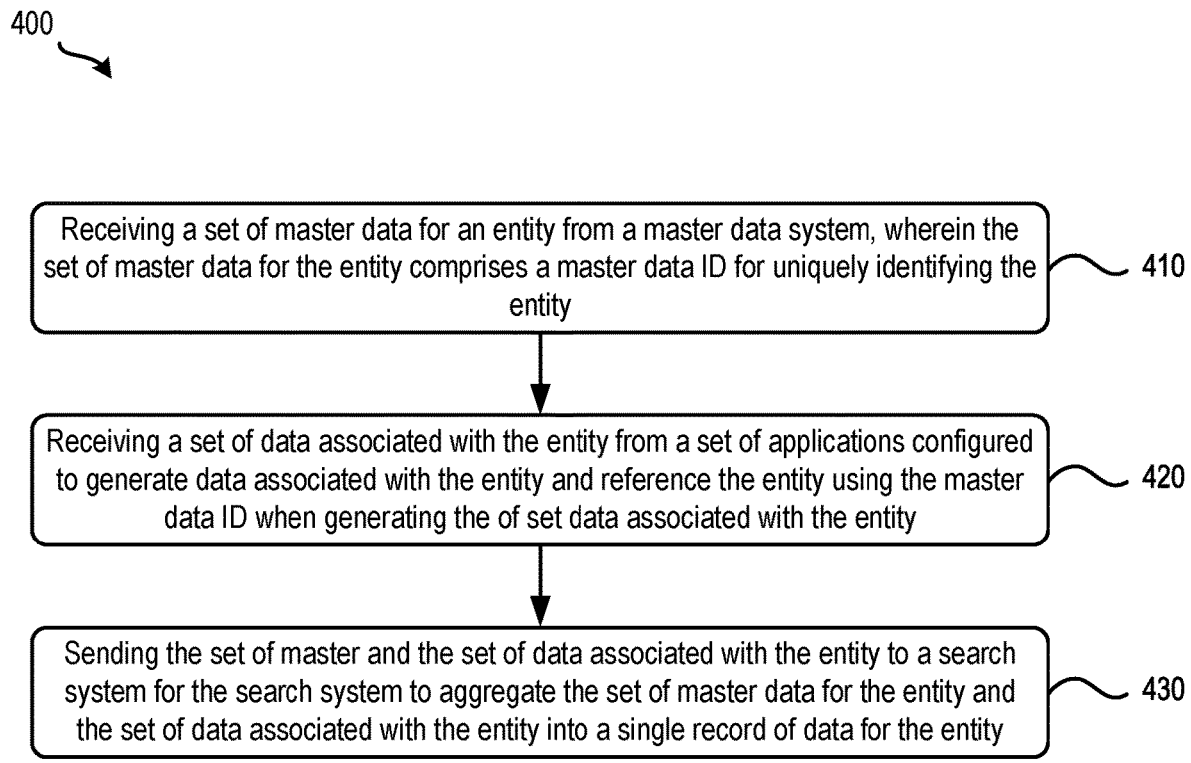
FIG. 4 illustrates a process for managing data for unified entity search according to some embodiments.

FIG. 4 illustrates a process 400 for managing data for unified entity search according to some embodiments. In some embodiments, data system 130 performs process 400. Process 400 begins by receiving, at 410, a set of master data for an entity from a master data system. The set of master data for the entity comprises a master data entity ID for uniquely identifying the entity. Referring to FIGS. 1 and 2 as an example, data processing system 130 can receive a set of master data from master data system 115. The master data is modeled using data model 200 and, thus, the set of master data includes a master data entity ID that uniquely identifies an entity.

Next, process 400 receives, at 420, a set of data associated with the entity from a set of applications configured to generate data associated with the entity and reference the entity using the master data entity ID when generating the of set data associated with the entity. Referring to FIGS. 1 and 2 as an example, data processing system 130 may receive a set of data from applications/services 170$a$ and 170$k$ in system 165. The set of data is modeled using data model 200 so it includes the master data entity ID.

Finally, process 400 sends, at 430, the set of master and the set of data associated with the entity to a search system for the search system to aggregate the set of master data for the entity and the set of data associated with the entity into a single record of data for the entity. Referring to FIGS. 1 and 3C as an example, data processing system 130 sends the set of master data and the set of data associated with the entity to search system 150. Search system 150 may aggregate the set of master data for the entity and the set of data associated with the entity into the single record of data 300 for the entity depicted in FIG. 3C.

Figure 5:
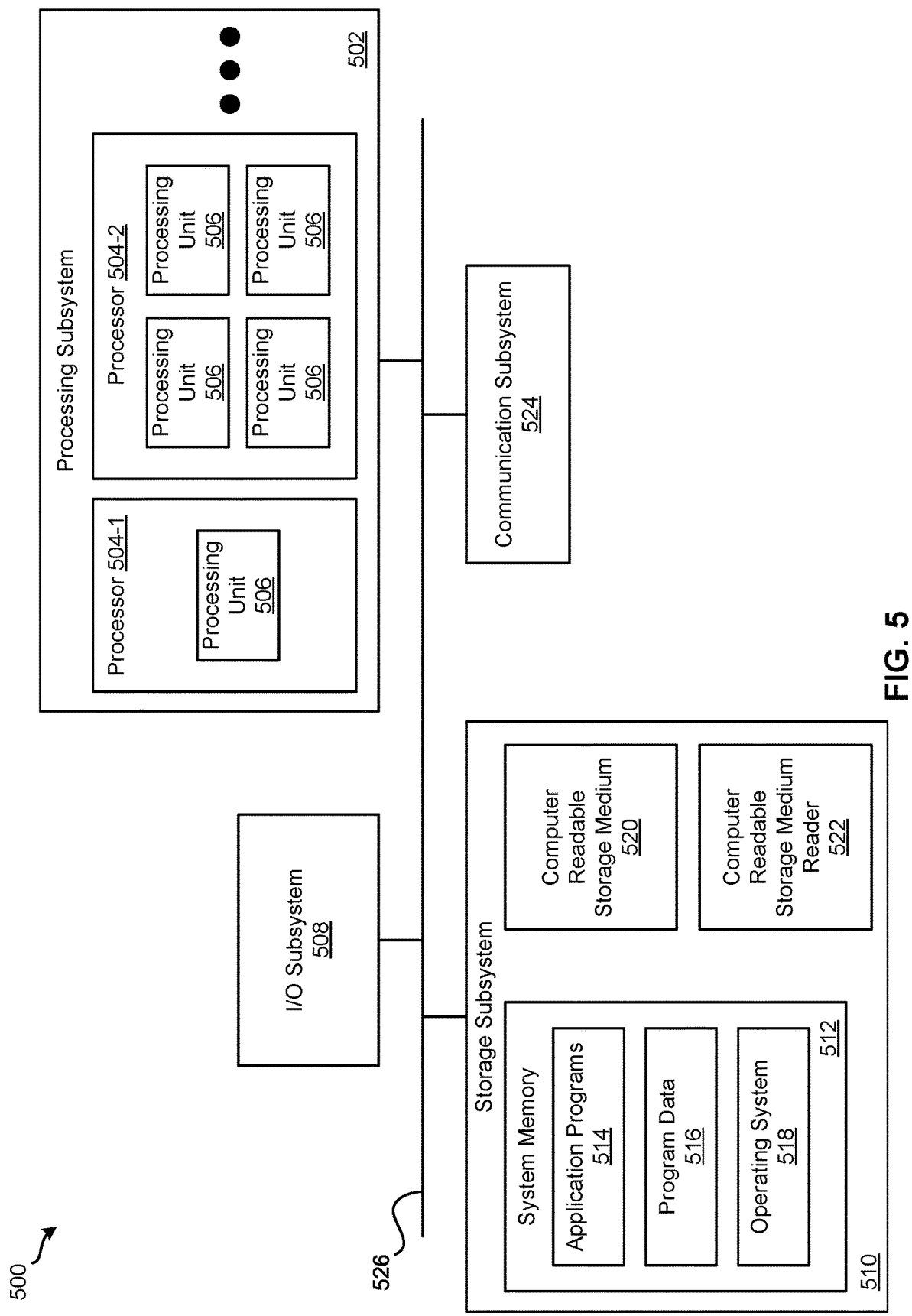
FIG. 5 illustrates an exemplary computer system, in which various embodiments may be implemented.

FIG. 5 illustrates an exemplary computer system 500 for implementing various embodiments described above. For example, computer system 500 may be used to implement client device 105, master data system 115, data processing system 130, search system 150, and systems of applications and services 165-185. Computer system 500 may be a desktop computer, a laptop, a server computer, or any other type of computer system or combination thereof. Some or all elements of master data manager 120, publishing manager 135, search service 140, record and search manager 155, applications/services 170$a$-$k$, applications/services 180$a$-1, applications/services 190$a$-$m$, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Extended ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., application 110, applications/services 170a-k, applications/services 180a-l, and applications/services 190a-m), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., master data manager 120, publishing manager 135, search service 140, record and search manager 155, applications/services 170a-k, applications/services 180a-l, and applications/services 190a-m) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSDs), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
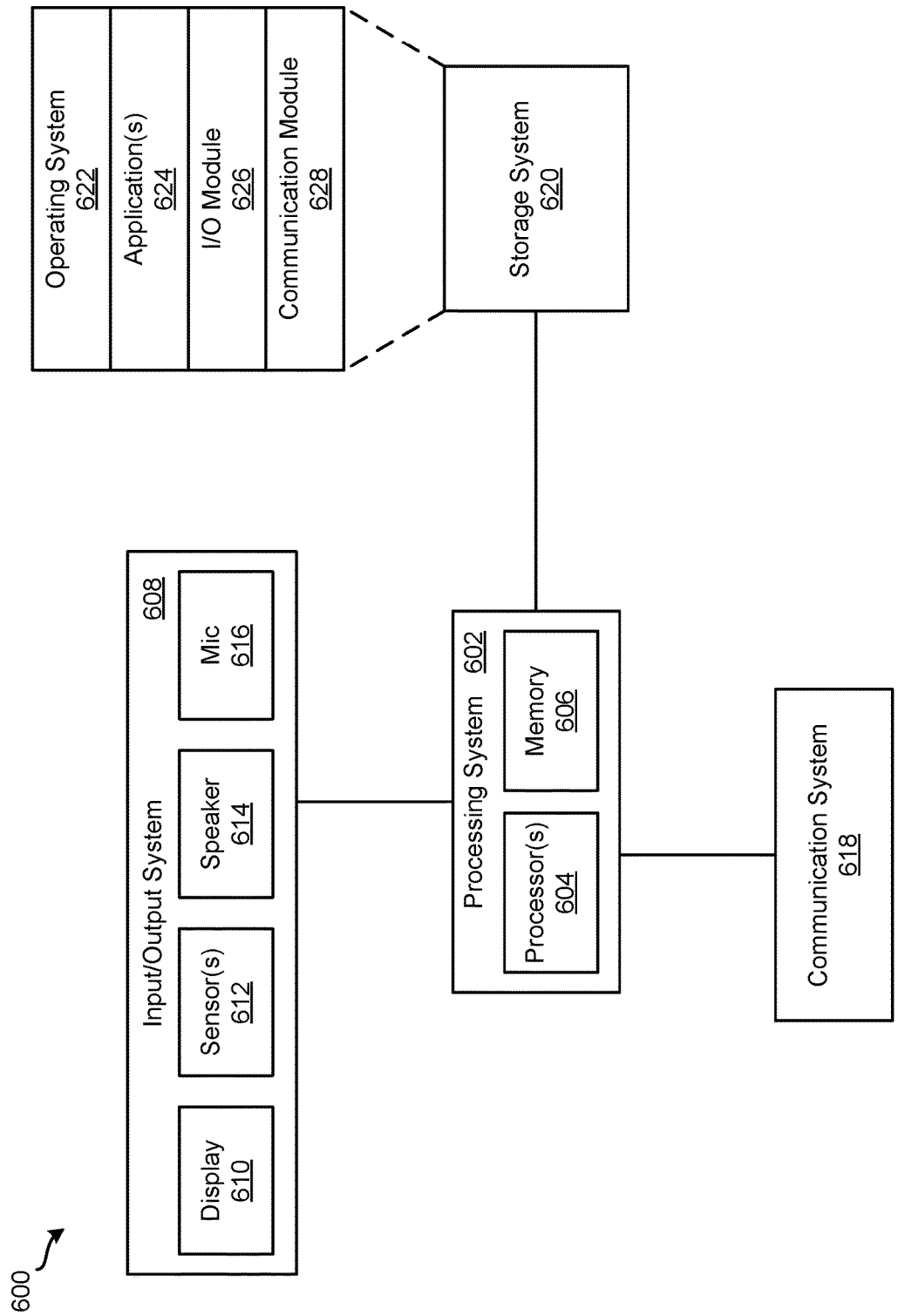
FIG. 6 illustrates an exemplary computing device, in which various embodiments may be implemented.

FIG. 6 illustrates an exemplary computing device 600 for implementing various embodiments described above. For example, computing device 600 may be used to implement client device 105. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606.

Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrated into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
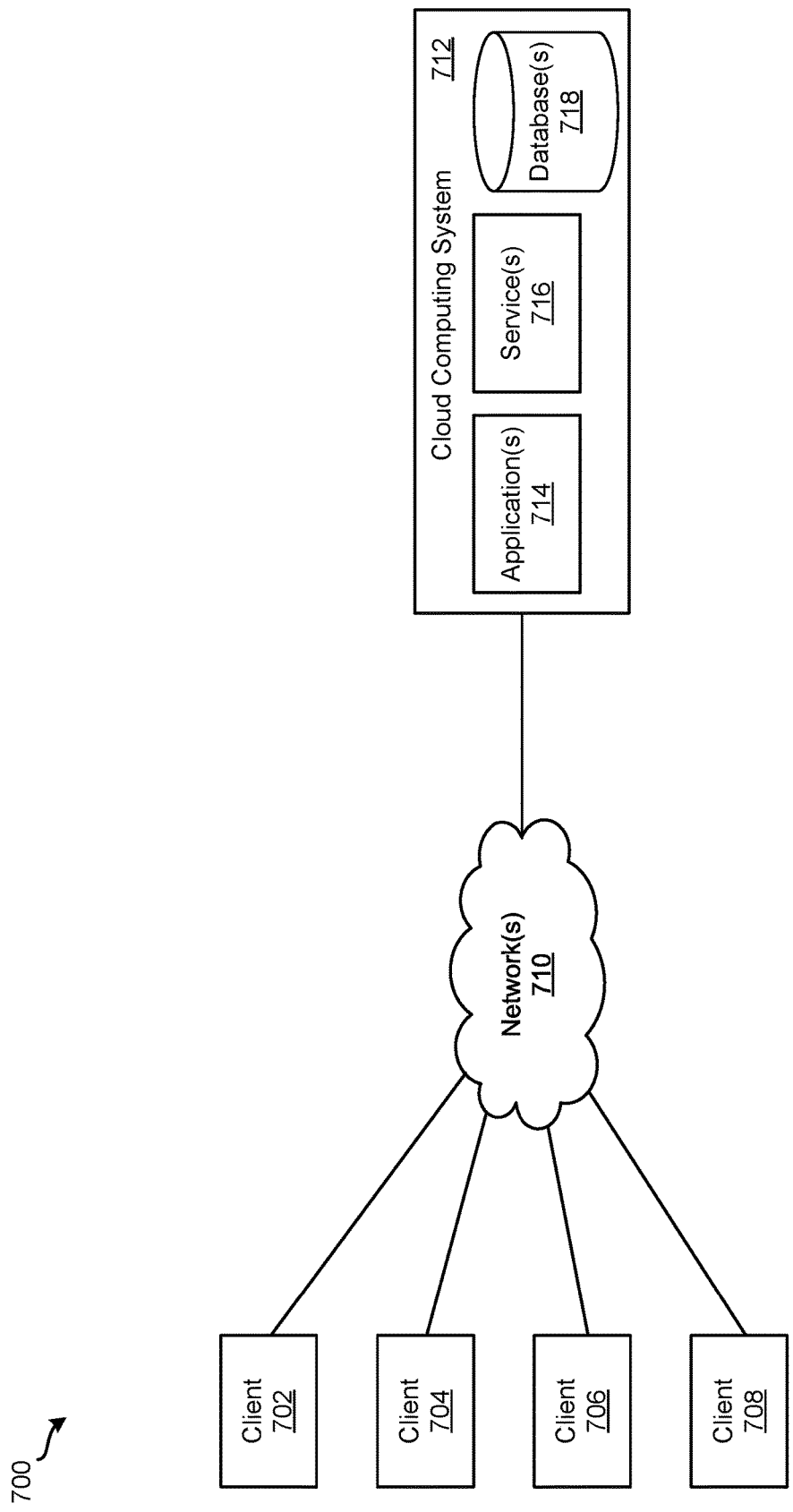
FIG. 7 illustrates an exemplary system, in which various embodiments may be implemented.

FIG. 7 illustrates an exemplary system 700 for implementing various embodiments described above. For example, one of client devices 702-708 may be used to implement client device 105, cloud computing system 712 may be used to implement master data system 115, data processing system 130, search system 150, and systems of applications and services 165-185. As shown, system 700 includes client devices 702-708, one or more networks 710, and cloud computing system 712. Cloud computing system 712 is configured to provide resources and data to client devices 702-708 via networks 710. In some embodiments, cloud computing system 712 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 712 may provide applications 714, services 716, and databases 718 to any number of different customers in a self-service, subscription-based, elastically scalable, reliable, highly available, and secure manner.

In some embodiments, cloud computing system 712 may be adapted to automatically provision, manage, and track a customer's subscriptions to services offered by cloud computing system 712. Cloud computing system 712 may provide cloud services via different deployment models. For example, cloud services may be provided under a public cloud model in which cloud computing system 712 is owned by an organization selling cloud services and the cloud services are made available to the general public or different industry enterprises. As another example, cloud services may be provided under a private cloud model in which cloud computing system 712 is operated solely for a single organization and may provide cloud services for one or more entities within the organization. The cloud services may also be provided under a community cloud model in which cloud computing system 712 and the cloud services provided by cloud computing system 712 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 712 is referred to as a "cloud service." Typically, servers and systems that make up cloud computing system 712 are different from the on-premises servers and systems of a customer. For example, cloud computing system 712 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transfer protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, master data storage 125, tenant ID mappings storage 145, and entity data records storage 160 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 712. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

receiving a set of master data for an entity from a master data system, wherein the set of master data for the entity comprises a master data entity ID for uniquely identifying the entity, wherein the set of master data for the entity and the set of data associated with the entity belong to a tenant, wherein the master data system uses a tenant ID to uniquely identify the tenant within the master data system;

receiving a set of data associated with the entity from a set of applications configured to generate data associated with the entity and reference the entity using the master data entity ID when generating the of set data associated with the entity;

aggregating the set of master data and the set of data associated with the entity into a single record of data for the entity using a search system comprising a document based search platform; and determining a global tenant ID for the tenant based on the tenant ID, wherein sending the set of master data to the search system comprises including the global tenant ID for the tenant with the set of master data.

2. The non-transitory machine-readable medium of claim 1, wherein determining the global tenant ID for the tenant comprises determining the global tenant ID for the tenant further based on a defined mapping that maps the global tenant ID to the tenant ID used by the master data system.

3. The non-transitory machine-readable medium of claim 1, wherein the tenant ID is a first tenant ID, wherein the global tenant ID is a first global tenant ID, wherein an application in the set of applications operating on a system is configured to use a second tenant ID to uniquely identify the tenant within the system, wherein the program further comprises a set of instructions for determining a second global tenant ID for the tenant based on the second tenant ID, wherein sending the set of data associated with the entity to the search system comprises including the second global tenant ID for the tenant with the set of data associated with the entity, wherein a first value of the first global tenant ID is the same as a second value of the second global tenant ID.

4. The non-transitory machine-readable medium of claim 1, wherein the program further comprises sets of instructions for:
receiving, from a particular application, a query for a set of data associated with a set of entities;
in response to receiving the query, forwarding the query to the search system for the search system to process the query based on a set of single records of data for entities managed by the search system;
receiving a set of results for the query from the search system; and
sending the set of results for the query to the particular application.

5. The non-transitory machine-readable medium of claim 1, wherein the search system aggregates the set of master data and the set of data associated with the entity into the single record of data for the entity by:
upon receiving the set of master data for the entity, generating the single record of data for the entity and including the set of master data for the entity in the single record of data, and
upon receiving the set of data associated with the entity, using the set of data associated with the entity to update the single record of data.

6. The non-transitory machine-readable medium of claim 1, wherein sending the set of master data and the set of data associated with the entity to the search system comprises sending the set of master data to the search system before sending the set of data associated with the entity to the search system.

7. A method comprising:
receiving a set of master data for an entity from a master data system, wherein the set of master data for the entity comprises a master data entity ID for uniquely identifying the entity, wherein the set of master data for the entity and the set of data associated with the entity belong to a tenant, wherein the master data system uses a tenant ID to uniquely identify the tenant within the master data system;
receiving a set of data associated with the entity from a set of applications configured to generate data associated with the entity and reference the entity using the master data entity ID when generating the of set data associated with the entity;
aggregating the set of master data and the set of data associated with the entity into a single record of data for the entity using a search system comprising a document based search platform; and
determining a global tenant ID for the tenant based on the tenant ID, wherein sending the set of master data to the search system comprises including the global tenant ID for the tenant with the set of master data.

8. The method of claim 7, wherein determining the global tenant ID for the tenant comprises determining the global tenant ID for the tenant further based on a defined mapping that maps the global tenant ID to the tenant ID used by the master data system.

9. The method of claim 7, wherein the tenant ID is a first tenant ID, wherein the global tenant ID is a first global tenant ID, wherein an application in the set of applications operating on a system is configured to use a second tenant ID to uniquely identify the tenant within the system, the method further comprising determining a second global tenant ID for the tenant based on the second tenant ID, wherein sending the set of data associated with the entity to the search system comprises including the second global tenant ID for the tenant with the set of data associated with the entity, wherein a first value of the first global tenant ID is the same as a second value of the second global tenant ID.

10. The method of claim 7 further comprising:
receiving, from a particular application, a query for a set of data associated with a set of entities;
in response to receiving the query, forwarding the query to the search system for the search system to process the query based on a set of single records of data for entities managed by the search system;
receiving a set of results for the query from the search system; and
sending the set of results for the query to the particular application.

11. The method of claim 7, wherein the search system aggregates the set of master data and the set of data associated with the entity into the single record of data for the entity by:
upon receiving the set of master data for the entity, generating the single record of data for the entity and including the set of master data for the entity in the single record of data, and
upon receiving the set of data associated with the entity, using the set of data associated with the entity to update the single record of data.

12. The method of claim 7, wherein sending the set of master data and the set of data associated with the entity to the search system comprises sending the set of master data to the search system before sending the set of data associated with the entity to the search system.

13. A system comprising:
a set of processing units; and
a non-transitory machine-readable medium storing instructions that when executed by at least one processing unit in the set of processing units cause the at least one processing unit to:
receive a set of master data for an entity from a master data system, wherein the set of master data for the entity comprises a master data entity ID for uniquely identifying the entity, wherein the set of master data for the entity and the set of data associated with the entity belong to a tenant, wherein the master data system uses a tenant ID to uniquely identify the tenant within the master data system;

receive a set of data associated with the entity from a set of applications configured to generate data associated with the entity and reference the entity using the master data entity ID when generating the of set data associated with the entity;

aggregate the set of master data and the set of data associated with the entity into a single record of data for the entity using a search system comprising a document based search platform; and determine a global tenant ID for the tenant based on the tenant ID, wherein sending the set of master data to the search system comprises including the global tenant ID for the tenant with the set of master data.

14. The system of claim 5, wherein determining the global tenant ID for the tenant comprises determining the global tenant ID for the tenant further based on a defined mapping that maps the global tenant ID to the tenant ID used by the master data system.

15. The system of claim 5, wherein the tenant ID is a first tenant ID, wherein the global tenant ID is a first global tenant ID, wherein an application in the set of applications operating on a system is configured to use a second tenant ID to uniquely identify the tenant within the system, wherein the instructions further cause the at least one processing unit to determine a second global tenant ID for the tenant based on the second tenant ID, wherein sending the set of data associated with the entity to the search system comprises including the second global tenant ID for the tenant with the set of data associated with the entity, wherein a first value of the first global tenant ID is the same as a second value of the second global tenant ID.

16. The system of claim 13, wherein the instructions further cause the at least one processing unit to:

receive, from a particular application, a query for a set of data associated with a set of entities;

in response to receiving the query, forward the query to the search system for the search system to process the query based on a set of single records of data for entities managed by the search system;

receive a set of results for the query from the search system; and send the set of results for the query to the particular application.

17. The system of claim 13, wherein the search system aggregates the set of master data and the set of data associated with the entity into the single record of data for the entity by:

upon receiving the set of master data for the entity, generating the single record of data for the entity and including the set of master data for the entity in the single record of data, and upon receiving the set of data associated with the entity, using the set of data associated with the entity to update the single record of data.

* * * * *